(12) United States Patent
Ju et al.

(10) Patent No.: US 6,214,391 B1
(45) Date of Patent: Apr. 10, 2001

(54) LIQUID FEEDSTUFF ADDITIVES AND PREPARATION THEREOF

(75) Inventors: Jong Gon Ju, Kyunggi-do; Jong Ho Koh, Seoul, both of (KR)

(73) Assignee: Nel Biotech Co., Ltd., Kyunggi-do (KR)

( * ) Notice: Subject to any disclaimer, the term of this patent is extended or adjusted under 35 U.S.C. 154(b) by 0 days.

(21) Appl. No.: 09/549,610

(22) Filed: Apr. 14, 2000

(30) Foreign Application Priority Data

Feb. 18, 2000 (KR) .................................................. 00-7890

(51) Int. Cl.⁷ .............................. A23K 1/175; A23L 1/30
(52) U.S. Cl. ............................................. 426/74; 426/807
(58) Field of Search ........................................ 426/74, 807

(56) References Cited

U.S. PATENT DOCUMENTS

| | | | | |
|---|---|---|---|---|
| 4,055,667 | * | 10/1977 | Linton et al. | 426/62 |
| 4,377,599 | * | 3/1983 | Willard, Jr. | 426/310 |
| 4,454,162 | * | 6/1984 | Schnze | 426/74 |
| 4,698,225 | * | 10/1987 | Morrison | 426/96 |
| 5,656,309 | * | 8/1997 | Sawhill | 426/41 |

FOREIGN PATENT DOCUMENTS 95-009944  9/1995 (KR) .

* cited by examiner

*Primary Examiner*—Chhaya D. Sayala
(74) *Attorney, Agent, or Firm*—McDermott, Will & Emery

(57) ABSTRACT

A functional liquid feedstock additive that has conspicuous advantages of increasing the productivity of livestock, activating immune competent cells to enhance the immunity of livestock against diseases, and improve meats of livestock into unsaturated fatty acid-rich ones. It is prepared by homogeneously dissolving a composition comprising 5–12 g of calcium alumina silicate ($CaOSiO_2Al_2O_3$), 5–12 g of sodium alumina silicate ($Na_2OAl_2O_3SiO_2$), 300–900 g of sodium silicate ($Na_2OSiO_2$), 400–1,200 g of potassium silicate ($K_2OSiO_2$), 200–600 g of sodium bicarbonate ($NaHCO_3$), 350–1,100 g of potassium carbonate ($K_2CO_3$), 250–800 g of sodium carbonate ($Na_2CO_3$), 10.8–2.5 g of zinc oxide, 0.4–4.5 g of germanium dioxide and 900–1,800 g of a reducing sugar in 1 liter of water under a flow of nitrogen gas with a redox potential being maintained in the range of −25 to 25 mV to give a gel phase and diluting the gel five-ten folds in water, and aging the gel at 20–35° C. for about 1–2 days under a flow of nitrogen gas with a redox potential being maintained in the range of −30 to 30 mV.

4 Claims, No Drawings

LIQUID FEEDSTUFF ADDITIVES AND PREPARATION THEREOF

BACKGROUND OF THE INVENTION

1. Field of the Invention

The present invention relates to a functional liquid feedstuff additive. More particularly, the present invention relates to a functional liquid feedstuff additive with which livestock can gain weight effectively as well as be significantly improved in immunity against diseases. Also, the present invention is concerned with a method for preparing such a functional liquid feedstuff additive.

2. Description of the Prior Art

Livestock production has had gradual tendency toward being conducted enterprisingly and on a large scale in Korea. Accordingly, the dense breeding in which a large multitude of livestock is bred within a limited space for reasons of productivity and economy is now being generalized in Korea. In addition, in response to the requirement for the improvement in the productivity of livestock farming, extensive and intensive research has been conducted. However, the dense breeding is problematic in that the livestock are more readily exposed to various diseases.

The productivity decrease and death of livestock, which is usually caused by its being afflicted with diseases, is one of the most serious problems that the livestock farming industries of the whole world, including the swine-breeding industry, commonly suffer from. To solve the problem, there was suggested a functional feedstock for livestock in Korean Pat. Publication No. 95-009944 entitled, "feedstuff containing a mixture of gentamycin and linkomycin or klindamycin, and additives or beverages for feedstuff", in which antibiotics and antiviral agents or growth hormones are combined with typical feedstock to enhance the immunity of livestock against diseases.

Such a conventional technique as uses antibiotics and the like in feedstuff seems to conspicuously improve the productivity of livestock farming, in a short term, but the final result that it brings about is the aggravation of livestock farming on account of the abuse of animal drugs or antibiotics. That is, the livestock which has been abusively administered with animal drugs or antibiotics become resistant to the animal drugs or antibiotics, but not to diseases. When being afflicted with diseases, they require more potent animal drugs or antibiotics than previously administered ones. In result, the addition of animal drugs or antibiotics in feedstuff weakens the natural immunity of livestock against diseases and induces chronic diseases in livestock. Further, the use of antibiotics for livestock is limitedly allowed because, when being administered to livestock, the antibiotics remain in the livestock foodstuff such as pork, menacing the health of the consumers.

In order to prevent livestock's suffering from diseases and to provide quality livestock foodstuffs, therefore, it is not recommended to administer to livestock chemicals such as antibiotics or other functional materials. Rather, it is preferable that the physiological conditions of livestock are optimized to enhance their inherent immunity against diseases. In addition, it is very economically favorable that the feedstuff fed is allowed to be almost completely absorbed and metabolized, thereby improving the meat quality in such a way that the content of unsaturated fatty acids, beneficial to the health of humans, increases while decreasing the saturated fatty acid content without using expensive functional materials.

SUMMARY OF THE INVENTION

Leading to the present invention, knowledge of the metabolism of cells, the microscopic and structural unit of all living organisms, allowed the selection of the optimal feedstuff composition suitable to activate the metabolism of cells. Based on the fact that living organisms live as a result of the metabolism of their cells, which are connected to the extracellular spaces and optimize their internal environments through cell membranes and the activation of immune competent cells enhances the immunity of the organisms and facilitates the cellular intake of external nutrients, the present invention utilizes aluminum compounds, silicon compounds, carbonate compounds, zinc oxide, and germanium dioxide as cell activating agents in combination with reducing sugars selected from glucose, fructose, sucrose and maltose, and sodium compounds while the compounds are mainly in forms of salts of sodium or potassium, which both play important roles in the function of cell membranes. In the present invention, these compounds are liquified into a gel which can be used as a functional additive for feedstuff. The functional feedstuff additive can enhance the immunity of livestock against diseases, aid livestock to absorb nutrients, and improve the quality of meat.

DETAILED DESCRIPTION OF THE INVENTION

In order to improve the livestock production, synthetic antibiotics, antiviral agents, and growth hormones have been conventionally used. However, as mentioned previously, their use includes serious problems. In a long-term point of view, the use of such agents results in injuring the health of livestock, deteriorating the growth of livestock and degrading the quality of meat. What is worse, when being fed to livestock, the chemical agents are not discharged from animal bodies, but accumulated therein, so that illness or even fatality may occur to the consumers who eat the meat of the livestock.

Therefore, with the aim of solving the above problems, there is provided a liquid feedstuff additive which is prepared by homogeneously dissolving in water a composition comprising aluminum compounds, silicon compounds, carbonate compounds, zinc oxide, germanium dioxide, and a reducing sugar selected from the group consisting of glucose, fructose, sucrose and maltose and gelling the solution. In order for livestock to easily ingest such effective compounds, the gel may be diluted in water or powdered. For the latter case, the gel is sprayed over commercially available formula feedstuff, aged, and dried. Without the help of additional antibiotics, antiviral agents and growth hormone, the feedstuff additive can promote the metabolism of livestock and activate immunocytes to enhance the inherent immunity against diseases. In addition, when being fed with the additive, the livestock gains weight, which is economically favorable for livestock raisers. Further, an improvement can be brought about in the quality of meats which become rich in unsaturated fatty acids with a decreasing of saturated fatty acids.

In accordance with an embodiment of the present invention, there is provided a liquid feedstuff additive which is in a gelled form from a composition comprising calcium alumina silicate, sodium alumina silicate, sodium silicate, potassium silicate, sodium bicarbonate, potassium carbonate, sodium carbonate, zinc oxide, germanium dioxide, and a reducing sugar selected from the group consisting of glucose, fructose, sucrose and maltose. In addition, the present invention is featured in that the liquid feedstuff additive is five-ten folds diluted in water on the basis of weight and allowed to age for 1–2 days at 20–35° C. under a controlled condition in which nitrogen gas is supplied with a redox potential being maintained at −30 to 30 mV.

In more detail, the functional liquid feedstuff additive comprises 5–12 g of calcium alumina silicate ($CaOSiO_2Al_2O_3$), 5–12 g of sodium alumina silicate ($Na_2OAl_2O_3SiO_2$), 300–900 g of sodium silicate ($Na_2OSiO_2$), 400–1,200 g of potassium silicate ($K_2OSiO_2$), 200–600 g of sodium bicarbonate ($NaHCO_3$), 350–1,100 g of potassium carbonate ($K_2CO_3$), 250–800 g of sodium carbonate ($Na_2CO_3$), 10.8–2.5 g of zinc oxide, 0.4–4.5 g of germanium dioxide and 900–1,800 g of a reducing sugar per liter of water. The additive is in a gel phase. In water of 70° C. or higher, the compounds are homogeneously dissolved under a flow of nitrogen gas with a redox potential being maintained in the range of −50 to 50 mV.

In accordance with another embodiment of the present invention, there is provided a method for preparing a liquid feedstuff additive, in which the liquid additive gel is five-ten folds diluted in water, aged at 20–35° C. for about 1–2 days under a flow of nitrogen gas with a redox potential being maintained in the range of −30 to 30 mV and then, dried.

In accordance with a further embodiment of the present invention, there is provided a functional feedstuff, comprising a combination of a formula feedstuff and the liquid feedstuff additive. This combination is obtained by diluting the liquid feedstuff additive five to ten folds in water, spraying the additive over the formula feedstuff at a weight ratio of 0.5–5 kg additive to 1,000 kg feedstuff, aging the sprayed formula feedstuff at 20–35° C. for about 1–2 days under a flow of nitrogen gas with a redox potential being maintained in the range of −30 to 30 mV, and drying it.

In the present invention, calcium alumina silicate and sodium alumina silicate may be used together or exclusively. In the former case, they are preferably used at the weight ratio of 1:1. Also, sodium silicate and potassium silicate may be used together or exclusively. When they are used together, their preferable weight ratio is 1:1. Sodium bicarbonate, potassium carbonate and sodium carbonate may be used singly or in combination. In the latter case, the individual compounds are preferably used at the same weight ratio.

As for the reducing sugar, it is selected from the group consisting of glucose, fructose, sucrose, maltose and mixtures thereof.

A better understanding of the present invention may be obtained in light of the following examples which are set forth to illustrate, but are not to be construed to limit the present invention.

EXAMPLE 1

Preparation of Functional Liquid Feedstuff Additive 8.3 g of calcium alumina silicate, 456 g of sodium silicate, 532 g of potassium carbonate, 1.62 g of zinc oxide, 2.44 g of germanium dioxide, and 1,350 g of glucose were successively added in a reactor containing 1 liter of water maintained at 80° C. under a controlled condition in which nitrogen gas was supplied with a redox potential of −40 to 40 mV, and subjected to a gelling process to give a gelled functional feedstuff additive.

EXAMPLE 2

Preparation of Liquid Feedstuff Additive Suitable for Feeding Livestock

The liquid feedstuff additive obtained in Example 1 was five folds diluted in water on the basis of weight, and aged at 20–25° C. for about 36 hours under a flow of nitrogen gas with a redox potential being maintained in the range of −25 to 25 mV to produce a liquid feedstuff additive suitable for feeding livestock.

EXAMPLE 3

Preparation of Granulated Feedstuff

After the liquid feedstuff additive obtained in Example 1 was five folds diluted in water on the basis of weight, 1.5 kg of the dilution was sprayed over 1,000 kg of commercially available formula feedstuff for absorption, and aged at 25–30 C. for 36 hours under a flow of a nitrogen gas with a redox potential being maintained in the range of −25 to 25 mV to give functional granulated feedstuff.

Test Example 1

Feedstuff Efficiency and Weight-Gaining Effect in Hog Farming 85 hogs which were 30 days old were divided into three groups: Group A (n=27) was fed with a commercially available formula feedstuff in combination with the liquid feedstuff additive of Example 2 which was 300 folds diluted in water; Group B (n=30) was fed with the granulated feedstuff obtained in Example 3; and Group C (n=28) was fed with a commercially available formula feedstuff. The feeding was continually conducted for 5 weeks. During the feeding, the hogs of each group were measured for their weight change. Feedstuff efficiency was calculated according to the following formula:

$$\text{Feedstuff Efficiency} = \frac{\text{Feedstuff fed (kg)}}{\text{Weight gained (kg)}}$$

The results are given in Table 1, below.

TABLE 1

| Groups | Mean Weight | Feedstuff Efficiency |
|---|---|---|
| A (n = 27) | 4.67 | 0.382 |
| B (n = 30) | 4.22 | 0.372 |
| C (n = 28) | 3.19 | 0.307 | n = population

As shown in Table 1, the test groups A and B showed average weights of 4.67 kg and 4.22 kg, respectively, after 5 weeks of the feeding while the control group C was 3.19 kg in average weight. As for the feedstuff efficiency, it was calculated to be 0.382 in the test group A and 0.372 in the test group B, both of which were significantly larger than that in the control group. Therefore, the feedstuff of the present invention is effective for breeding livestock.

Test Example 2

Effect on Immunity of Swine Against Cholera 1

30 piglets which were 30 days old were grouped in tens: Group A-1 was fed with a commercially available formula feedstuff in combination with the liquid feedstuff additive of Example 2 which was 300 folds diluted in water; Group B-1 was fed with the powdered feedstuff obtained in Example 3; and Group C-1 was fed with a commercially available formula feedstuff. The feeding was continually conducted for 11 weeks. During this feeding period, all swine were immunized twice with a cholera vaccine. They were primarily injected with cholera vaccine in the fifth week after the birth, followed by secondary vaccination in the ninth week. When 11 weeks old, all hogs having undergone primary and secondary cholera vaccinations, were subjected to the forced inoculation with cholera virus by injection with 2 ml of HCV virulent $10^4 TCID_{50}$. During additional four-week feeding, all swine were observed as to their immunity. While being fed with the feedstuff from the 30th day after their birth to the 14th week, the hogs were measured for the change in immune competent cells before and after the aggressive inoculation with cholera virus.

Peripheral blood leukocytes were isolated from the blood of each swine in accordance with the method of David et al. (1987). An examination was made of the levels of immune competent cells, major histocompatibility complex and lymphocyte sub-group in blood by use of leukocyte surface monoclonal antibodies and flow cytometry (David et al., 1990). The results are given in Table 2, below.

TABLE 2

| Groups | Vaccine Ab Titers | Immune Cell Activity | | |
|---|---|---|---|---|
| | | MHC-Class II | CD4+ T Lymphocyte | B Cells |
| A-1 (n = 10) | [1]Post-Treatment | 130.0 | 23.23 ± 6.26 | 26.15 ± 3.63 | 12.88 ± 2.38 |
| | [2]Pre-Treatment | 4.9 | 15.55 ± 2.75 | 30.68 ± 2.65 | 11.78 ± 0.75 |
| B-1 (n = 10) | Post-Treatment | 352.0 | 20.52 ± 4.94 | 24.65 ± 1.36 | 12.78 ± 1.51 |
| | Pre-Treatment | <4 | 14.65 ± 2.07 | 23.48 ± 4.22 | 7.98 ± 1.67 |
| C-1 (n = 10) | Post-Treatment | 101.3 | 17.60 ± 0.00 | 23.50 ± 0.00 | 11.30 ± 0.00 |
| | Pre-Treatment | 11.1 | 14.57 ± 3.18 | 32.97 ± 0.94 | 10.45 ± 2.23 |

[1]measured after two weeks of two rounds of vaccination
[2,4]measured after the forced inoculation of cholera virus conducted after two weeks of two rounds of vaccination
[3]measured shortly after the initiation of the feeding
*n: population As shown in Table 2, the antibody titers were measured to be 130 in the test group A-1 and 352 in the test group B-1, on the average, both of which were larger than that of the control group C-1. As for the activity of immune cells after the forced inoculation with cholera virus, it was improved in the test groups A-1 and B-1 compared with in the control group C-1, as measured for MHC-class II, CD4+, and B lymphocyte, which all play important roles in cellular and humoral immune responses.

Thus, the liquid feedstuff additive and the powdered feedstuff, according to the present invention, brought about an improvement in antibody titer as well as in MHC-class II, CD4+ T lymphocyte and B cell.

Test Example 3

Effect on Immunity of Swine Against Cholera 2

30 piglets which were 30 days old were grouped in tens: Group A-2 was fed with a commercially available formula feedstuff in combination with the liquid feedstuff additive of Example 2 which was 300 folds diluted in water; Group B-2 was fed with the powdered feedstuff obtained in Example 3; and Group C-2 was fed with a commercially available formula feedstuff. During the feeding period, none of the piglets were vaccinated. When nine weeks old, the swine were allowed to undergo the forced inoculation with cholera virus by the injection of 2 ml of HCV virulent $10^4 TCID_{50}$. The feeding was conducted for an additional four weeks. All swine were examined for antibody titers. While being fed with the feedstuff from the 30th day after their birth to the 14th week, the swine were measured for the change in immune competent cells before and after the forced inoculation with cholera virus.

An examination was made of the levels of major histocompatibility complex and lymphocyte sub-group in blood, as in Test Example 2. The results are given in Table 3, below.

TABLE 3

| Groups | Vaccine Ab Titers | Immune Cell Activity | |
|---|---|---|---|
| | | MHC-Class II | B Cell |
| A-2 (n = 10) | [1]Post-Treatment | 3,712.0 | 19.04 ± 6.26 | 16.14 ± 2.15 |
| | [2]Pre-Treatment | 7.1 | *N.D. | *N.D. |
| B-2 (n = 10) | Post-Treatment | 2,994.0 | 20.73 ± 3.74 | 14.38 ± 1.94 |
| | Pre-Treatment | 5.3 | 11.17 ± 0.74 | 9.33 ± 1.67 |
| C-2 (n = 10) | Post-Treatment | 1,312.0 | 12.09 ± 1.23 | 11.90 ± 1.15 |
| | Pre-Treatment | <4 | 14.64 ± 1.79 | 10.81 ± 1.50 |

*not determined
[1,2,4]measured 20 days after the forced inoculation of cholera virus
[3]measured shortly after the initiation of the feeding
*n: population As shown in Table 3, the antibody titers were measured to be 3,712 in the test group A-2 and 2,994 in the test group B-2, on the average, both of which were larger than that of the control group C-2. As for the activity of immune cells after the forced inoculation with cholera virus, it was improved in the test groups A-1 and B-1 compared with that in the control group C-1, as measured for MHC-class II and B lymphocyte.

Thus, the liquid feedstuff additive and the powdered feedstuff, according to the present invention, brought about an improvement in antibody titer as well as in MHC-class II, CD4+ T lymphocyte and B cell.

Consequently, as apparent in Test Examples 2 and 3, the feedstuff supplemented with the liquid feedstuff additive of the present invention can enhance the immunity of livestock against diseases by increasing the immune cells which are responsible for cellular and humoral immune responses.

Test Example 4

Effect on Pork Quality

In order to compare the pork quality between swine fed with conventional feedstuff and the present feedstuff, an examination was made of the portions of the saturated and the unsaturated fatty acid components in the pork. In this regard, 25 piglets at the age of 30 days, were divided into three groups: Group A-3 (n=7) was fed with a commercially available formula feedstuff in combination with the liquid feedstuff additive of the present invention; Group B-3 (n=10) was fed with the powdered feedstuff according to the present invention; and Group C-3 (n=8) was fed with a commercially available formula feedstuff. The feeding was conducted until the swine were butchered. The measurement results of the pork components are given in Table 4, below.

TABLE 4

| Fatty Acids | Groups | | |
|---|---|---|---|
| | A-3 (n = 7) | B-3 (n = 10) | C-3 (n = 8) |
| Saturated (%) | 34 | 33 | 41 |
| Unsaturated (%) | 66 | 67 | 59 |

As indicated in Table 4, the pork of the swine bred with the feedstuff according to the present invention contained a smaller amount of saturated fatty acid components, which are found to be a main factor causing adult diseases, by about 18.78%, but was more increased in unsaturated fatty acid components, beneficial to the health of the body, by about 12.71% than that of the swine bred with the conventional feedstuff. Therefore, the pork of the swine fed with the feedstuff according to the present invention can be highly evaluated as a functional pork effective for the prevention of adult diseases.

As described hereinbefore, the liquid feedstuff additive of the present invention has conspicuous advantages of increasing the productivity of livestock, activating immune competent cells to enhance the immunity of livestock against diseases, and improve meats of livestock into unsaturated fatty acid-rich ones.

The present invention has been described in an illustrative manner, and it is to be understood that the terminology used is intended to be in the nature of descriptions rather than of limitation. Many modifications and variations of the present invention are possible in light of the above teachings. Therefore, it is to be understood that within the scope of the appended claims, the invention may be practiced otherwise than as specifically described.

What is claimed is:

1. A functional liquid feedstuff additive, comprising 5–12 g of calcium alumina silicate ($CaOSiO_2Al_2O_3$), 5–12 g of sodium alumina silicate ($Na_2OAl_2O_3SiO_2$), 300–900 g of sodium silicate ($Na_2OSiO_2$), 400–1,200 g of potassium silicate ($K_2OSiO_2$) 200–600 g of sodium bicarbonate ($NaHCO_3$), 350–1,100 g of potassium carbonate ($K_2CO_3$), 250–800 g of sodium carbonate ($Na_2CO_3$), 10.8–2.5 g of zinc oxide, 0.4–4.5 g of germanium dioxide and 900–1,800 g of a reducing sugar per liter of water, which is in a gel phase and homogeneously dissolved under a flow of nitrogen gas with a redox potential being maintained in the range of −50 to 50 mV.

2. A functional feedstuff, comprising a combination of a formula feedstuff and the liquid feedstuff additive of claim 1, the combination being achieved by diluting the liquid feedstuff additive five to ten folds in water, spraying the additive over the formula feedstuff at a weight ratio of 0.5–5 kg additive to 1,000 kg feedstuff, aging the sprayed formula feedstuff at 20–35° C. for about 1–2 days under a flow of nitrogen gas with a redox potential being maintained in the range of −30 to 30 mV, and drying it.

3. A functional liquid feedstock additive as set forth in claim 1, wherein the reducing sugar is selected from the group consisting of glucose, fructose, sucrose, maltose and mixtures thereof.

4. A method for preparing a functional liquid feedstuff additive, in which a composition comprising 5–12 g of calcium alumina silicate ($CaOSiO_2Al_2O_3$), 5–12 g of sodium alumina silicate ($Na_2OAl_2O_3SiO_2$), 300–900 g of sodium silicate ($Na_2OSiO_2$), 400–1,200 g of potassium silicate ($K_2OSiO_2$), 200–600 g of sodium bicarbonate ($NaHCO_3$), 350–1,100 g of potassium carbonate ($K_2CO_3$), 250–800 g of sodium carbonate ($Na_2CO_3$), 10.8–2.5 g of zinc oxide, 0.4–4.5 g of germanium dioxide and 900–1,800 g of a reducing sugar is homogeneously dissolved in one liter of water under a flow of nitrogen gas with a redox potential being maintained in the range of −25 to 25 mV to give a gel phase and the gel is five-ten folds diluted in water and aged at 20–35° C. for about 1–2 days under a flow of nitrogen gas with a redox potential being maintained in the range of −30 to 30 mV.

* * * * *